US012657285B2

(12) United States Patent (10) Patent No.: US 12,657,285 B2
Larusson et al. (45) Date of Patent: Jun. 16, 2026

(54) FILE SYSTEM ACCESS DURING RUNTIME OF A PORTABLE EXECUTABLE PROGRAM

(71) Applicant: NetApp, Inc., San Jose, CA (US)

(72) Inventors: Tryggvi Larusson, Reykjavik (IS);
Fridvin Oddbjornsson, Reykjavik (IS)

(73) Assignee: NetApp, Inc., San Jose, CA (US)

( * ) Notice: Subject to any disclaimer, the term of this
patent is extended or adjusted under 35
U.S.C. 154(b) by 129 days.

(21) Appl. No.: 18/423,357

(22) Filed: Jan. 26, 2024

(65) Prior Publication Data

US 2024/0320321 A1 Sep. 26, 2024

Related U.S. Application Data

(60) Provisional application No. 63/454,010, filed on Mar.
22, 2023.

(51) Int. Cl.
*G06F 21/53* (2013.01)
*G06F 16/182* (2019.01)
*G06F 16/188* (2019.01)
*G06F 21/62* (2013.01)

(52) U.S. Cl.
CPC ............ *G06F 21/53* (2013.01); *G06F 16/183*
(2019.01); *G06F 16/188* (2019.01); *G06F*
*21/6218* (2013.01); *G06F 2221/034* (2013.01)

(58) Field of Classification Search
CPC ....... G06F 21/53; G06F 16/183; G06F 16/188
See application file for complete search history.

(56) References Cited

U.S. PATENT DOCUMENTS 9,141,360 B1 * 9/2015 Chen ......................... G06F 8/52
2016/0004858 A1 * 1/2016 Chen ....................... G06F 21/10
726/17

* cited by examiner

*Primary Examiner* — Beemnet W Dada

(57) ABSTRACT

The technology disclosed herein enables access to a file
system by a portable executable program. In a particular
example, a method includes, in a host executing the portable
executable program, recognizing the portable executable
program is executing on the one or more processing systems
and determining the portable executable program is config-
ured to access the file system. The method also includes
directing the portable executable program to create a module
therein for file system access and creating an abstraction
layer with which the module exchanges file system com-
mands. In the abstraction layer, the method includes trans-
lating the file system commands to translated commands for
the file system and exchanging translated commands
between the abstraction layer and the file system.

21 Claims, 10 Drawing Sheets

300

RUN PORTABLE EXECUTABLE PROGRAM 101    501

REQUEST ACCESS TO A FILE SYSTEM FROM APPLICATION SYSTEM INTERFACE 122    502

RECEIVE ACCESS TO VIRTUAL FILE SYSTEM IN ABSTRACTION LAYER 301    503

ANOTHER FILE SYSTEM?    504

YES

NO

INTERACT WITH VIRTUAL FILE SYSTEM(S) TO ACCESS FILE SYSTEM(S)    505

500

FILE SYSTEM ACCESS DURING RUNTIME OF A PORTABLE EXECUTABLE PROGRAM

RELATED APPLICATIONS

This application is related to and claims priority to U.S. Provisional Patent Application 63/454,010, titled "FILE SYSTEM ACCESS DURING RUNTIME OF A POR-TABLE EXECUTABLE PROGRAM," filed Mar. 22, 2023, and which is hereby incorporated by reference in its entirety.

TECHNICAL FIELD

Process virtualization using portable executable pro-grams, such as those created using WebAssembly (Wasm).

BACKGROUND

A portable executable program is a set of executable instructions that are hardware independent. As such, the portable executable program is portable in the sense that it is hardware-independent and can run on any hardware via a host executing on the hardware. WebAssembly (Wasm) is a popular example of an instruction format used for portable executable programs. Wasm instructions were originally designed to mimic assembly language instructions such that the Wasm instructions can be easily converted by the host into instructions executed by the specific hardware (what-ever that hardware may be). This enables Wasm instructions to be executed at near-native speed. Furthermore, the Wasm instructions are part of a sandboxed environment, which prevents the instructions from affecting anything external to the sandboxed environment by default.

SUMMARY

The technology disclosed herein enables access to a file system by a portable executable program. In a particular example, a method includes, in a host executing the portable executable program, recognizing the portable executable program is executing on the one or more processing systems and determining the portable executable program is config-ured to access the file system. The method also includes directing the portable executable program to create a module therein for file system access and creating an abstraction layer with which the module exchanges file system com-mands. In the abstraction layer, the method includes trans-lating the file system commands to translated commands for the file system and exchanging translated commands between the abstraction layer and the file system.

In other examples, an apparatus performs steps similar to those in the above-recited method and computer readable storage media directs a processing system to perform the similar steps.

DETAILED DESCRIPTION

Figure 1:
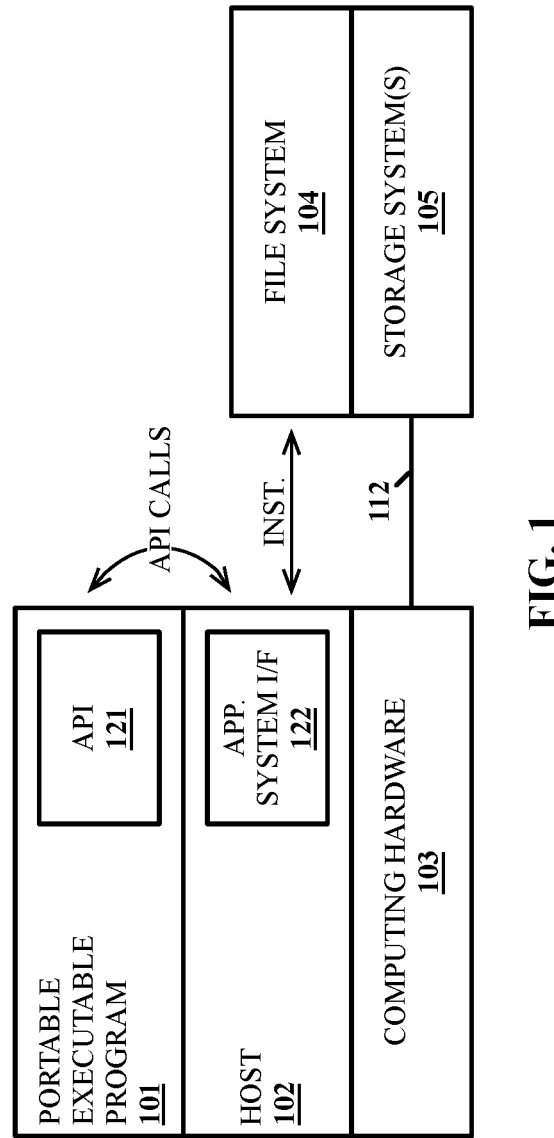
FIG. 1 illustrates an implementation for accessing a file system from a portable executable program during runtime.

Given the sandboxed nature of portable executable pro-grams, such as those using WebAssembly (Wasm) format-ting, a portable executable program is only able to access resources provided by a host in which the portable execut-able program is executing. The sandboxed arrangement has security benefits because, for example, a malicious portable executable program on its own (i.e., without assistance from the host) cannot affect other aspects of the computing system outside of the portable executable program. Wasm in par-ticular was originally designed as an improvement for applications executing in a web browser because the light-weight nature of Wasm's assembly language inspired instructions can still run with near-native performance even though they are being executed within another application (i.e., the web browser). By sandboxing Wasm applications, a user browsing the web is less likely to be affected by any malicious code that happens to be included in a Wasm application provided by a website.

In the time since Wasm was first introduced, additional use cases for Wasm have been identified. For example, the assembly language inspired instructions typically require far less resources than commonly used forms of virtualization. Virtual machines and containers both require more overhead with virtual machines typically requiring an entire operating system along with virtualized hardware. If a process can be created using Wasm, the process will in all likelihood use far fewer system resources than virtualizing the process in a virtual machine or container, which both likely include resources that the process does not need to execute. Espe-cially in situations where multiple instances of a process are desired (e.g., for a large data processing job), using Wasm instances can greatly reduce the computing resources required to run those instances.

However, given the sandboxing of Wasm applications discussed above, a Wasm application by default will not be able access an external file system to access information stored therein. As such, data used by the Wasm application may have to be passed into the Wasm application by the host or coded into the Wasm application. In some cases, a virtual file system may be implemented by a host for a Wasm application to access. The virtual file system is independent of any other file system and, typically, can only be accessed by the Wasm application for which the virtual file system is generated. The Wasm application cannot access a file system underlying the virtual file system or any other file system accessible by the computing hardware on which the Wasm application is executing, such as a network file system (NFS). Inability to access a file system limits what process-ing the Wasm application can be configured to perform. For example, a file system may include data for processing. If a Wasm application had access to the file system, many instances of the Wasm application can work together to process the data off the file system directly (e.g., without having to rely on a host to select portions of data for processing and passing the selected portions to the respective Wasm application instances). The hosts described below provide portable executable programs, such as Wasm applications, with an abstraction layer to access a file system on the portable executable programs' own accord.

FIG. 1 illustrates implementation 100 for accessing a file system from a portable executable program during runtime. Implementation 100 includes portable executable program 101, host 102, computing hardware 103, file system 104, and storage system 105. Computing hardware 103 and storage system 105 communicate over communication link 112.

Communication link 112 may include one or more wireless and/or wired physical communication links. Although shown as a direct link, communication link 112 may also include one or more intervening systems, networks, and devices. Computing hardware 103 may include processing resources (e.g., processing circuitry, central processing units, graphics processing units, data processing units, etc.), memory resources (e.g., random access memory, hard disk drive(s), flash memory, network attached storage systems, etc.), networking resources (e.g., wired and/or wireless networking circuitry, ports, etc.), or any other type of physical computing resource. Storage system 105 may include similar physical resources to those described for computing hardware 103, although, storage system 105 may be focused primarily on providing data storage over communication link 112. In some examples, at least a portion of storage system 105 may be included in computing hardware 103 such that at least a portion of file system 104 may extend to the memory resources provided by computing hardware 103. In some examples, file system 104 may be a network file system, which is a type of file system distributed across multiple storage systems over a network while presenting itself as a single file system.

Implementation 100 is merely an example of a computing environment in which a portable executable program may execute. Other examples may use alternative configurations and may have different components. For example, more portable executable programs than just portable executable program 101 may be executing on host 102 or host 102 may be executing on an operating system rather than directly on computing hardware 103. In other examples, one or both of computing hardware 103 and storage system 105 may be virtualized hardware on physical hardware not shown in implementation 100.

Portable executable program 101 is a set of processing instructions in a format that enables portable executable program 101 to execute on any type of hardware through a host capable of supporting the portable executable program 101 (i.e., host 102 in this example). A popular type of portable executable program 101 is a Wasm application, although, other portable formats may be used for portable executable program 101. Host 102 is shown as a stand-alone runtime environment for portable executable programs. However, host 102 may be part of another application executing on computing hardware 103 (e.g., may be a component of a web browser application). Portable executable program 101 includes application programming interface (API) 121, which includes instructions for communicating with application system interface 122 provided by host 102. API messages between API 121 and application system interface 122 enable portable executable program 101 to access features of computing hardware 103 (e.g., I/O)

provided by host 102. Specifically, API 121 defines messages to mount file system 104 to portable executable program 101 and host 102 performs operation 200 described below to mount file system 104 based on those messages.

Figure 2:
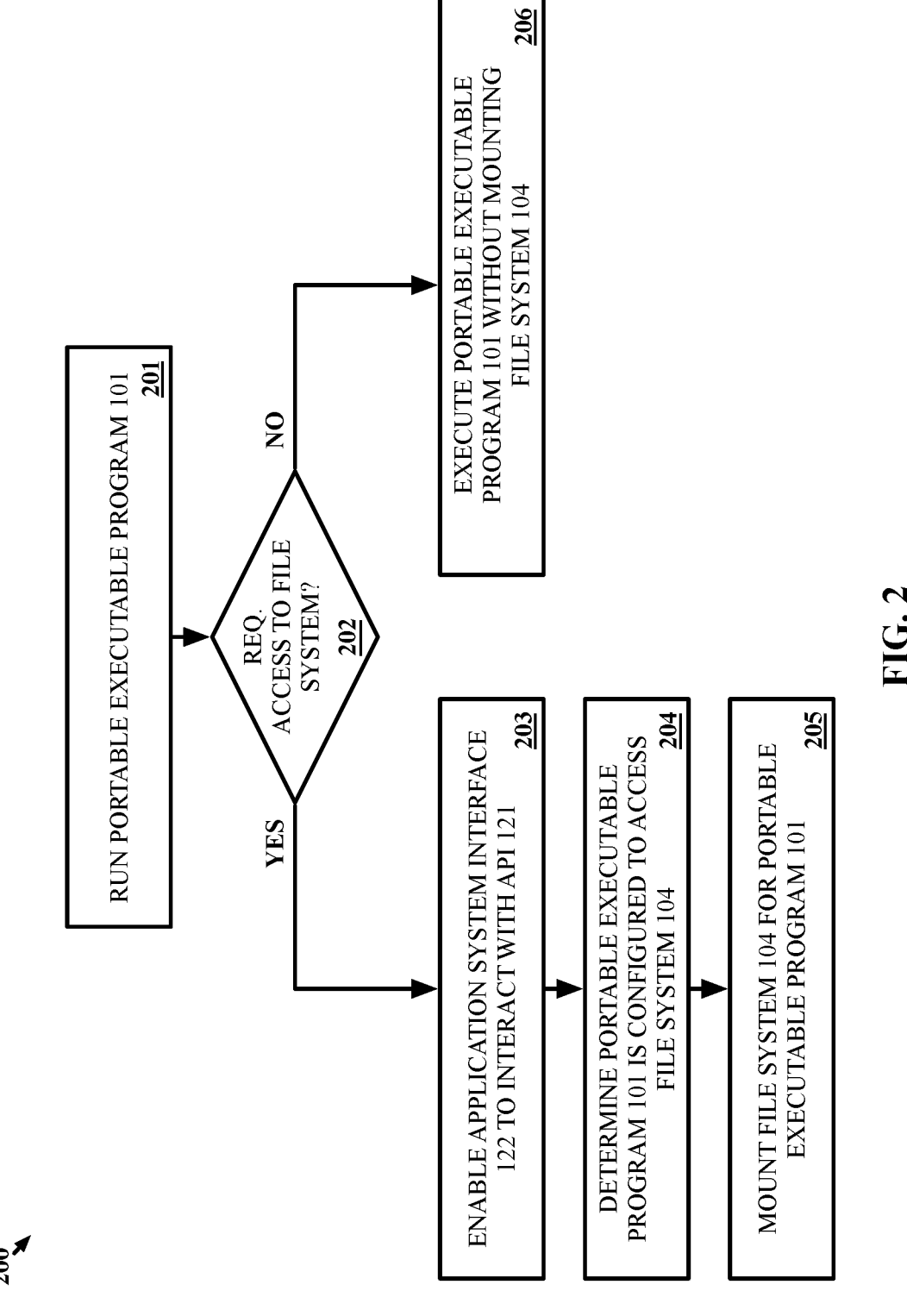
FIG. 2 illustrates an operation to access a file system from a portable executable program during runtime.

FIG. 2 illustrates operation 200 to access a file system from a portable executable program during runtime. Operation 200 is an example of method steps that may be performed by host 102 to mount file system 104 to portable executable program 101. In operation 200, host 102 runs portable executable program 101 (step 201). Host 102 may store portable executable program 101 locally (e.g., in a hard drive or solid-state drive) prior to running portable executable program 101 or may receive portable executable program 101 from another system (e.g., may receive portable executable program 101 over a network). Conventional portable executable programs do not request or receive access to file systems stored on, or otherwise accessible by, the host. Portable executable program 101 is not conventional, as portable executable program 101 is programmed to request access to file system 104. Host 102 determines portable executable program 101 is going to request access to a file system (step 202). If host 102 determines that portable executable program 101 is not going to request access to a file system, host 102 proceeds to execute portable executable program 101 as a conventional portable executable program without mounting a file system (step 206).

In response to portable executable program 101 requesting access to file system 104, host 102 enables application system interface 122 to interact with API 121 (step 203). Application system interface 122 for Wasm applications may be the WebAssembly System Interface (WASI), although, other interfaces may be used for Wasm or for other portable executable program formats. Application system interface 122 is configured to exchange messages with API 121. API 121 at least defines messages for mounting file systems to portable executable program 101 but may also define messages for performing other tasks.

Application system interface 122 determines that portable executable program 101 is configured to access file system 104 (step 204). To make the determination, application system interface 122 may receive a message from portable executable program 101 via API 121 requesting access to file system 104, application system interface 122 may be configured to automatically provide access to instances of portable executable program 101 when instantiated, or some other event may trigger application system interface 122 to recognize that file system 104 should be mounted for portable executable program 101. Portable executable program 101 may request that file system 104 specifically should be mounted (e.g., using an identifier for file system 104, such as a network address for storage system 105), may request that a file system matching characteristics of file system 104 be mounted, file system 104 may be the only file system available to mount, or application system interface 122 may recognize that file system 104 is the requested file system in some other manner. In some examples, application system interface 122 may determine whether portable executable program 101 is authorized to access file system 104. For example, application system interface 122 may be configured to only allow certain defined portable executable programs to access file system 104 so application system interface 122 may confirm portable executable program 101 is one of the defined portable executable programs.

After determining that portable executable program 101 is configured to access file system 104, application system interface 122 mounts file system 104 for portable executable program 101 (step 205). Mounting file system 104 may include creating an abstraction layer in application system interface 122 that API 121 will interact with to access file system 104. The abstraction layer may enable translation between file system instructions used by API 121 and corresponding instructions for file system 104. As noted previously, an advantage of portable executable programs is that they can run in any host regardless of architectures underlying the host. Given that there are many different types of file systems (e.g., File Allocation Table (FAT), New Technology File System (NTFS), Unix File System (UFS), Hierarchal File System (HFS), etc.) that are each accessed using different conventions, translation by the abstraction layer enables API 121 to use a single convention that is translated to whatever format file system 104 happens to be by the abstraction layer. In other examples, the abstraction layer may simply provide a passthrough of file system instructions between API 121 and file system 104. In such examples, portable executable program 101 may be designed specifically to operate on file system format used by file system 104. The necessary conventions of file system 104 may, therefore, be programmed into API 121 obviating the need for the abstraction layer to do translation.

Regardless of whether translation occurs in the abstraction layer, portable executable program 101 can use API 121 to access file system 104 by exchanging messages with the abstraction layer. As such, while the abstraction layer isolates portable executable program 101 from interacting with file system 104 directly, the abstraction layer is still enabling access to file system 104 by presenting file system 104 (or a projection thereof) to API 121 as it exists outside of host 102. Changes made via API 121 to file system 104 as presented by the abstraction layer are, therefore, reflected one for one in file system 104. Other instances of portable executable program 101 for which operation 200 similarly occurs can also access and navigate directories of file system 104.

Figure 3:
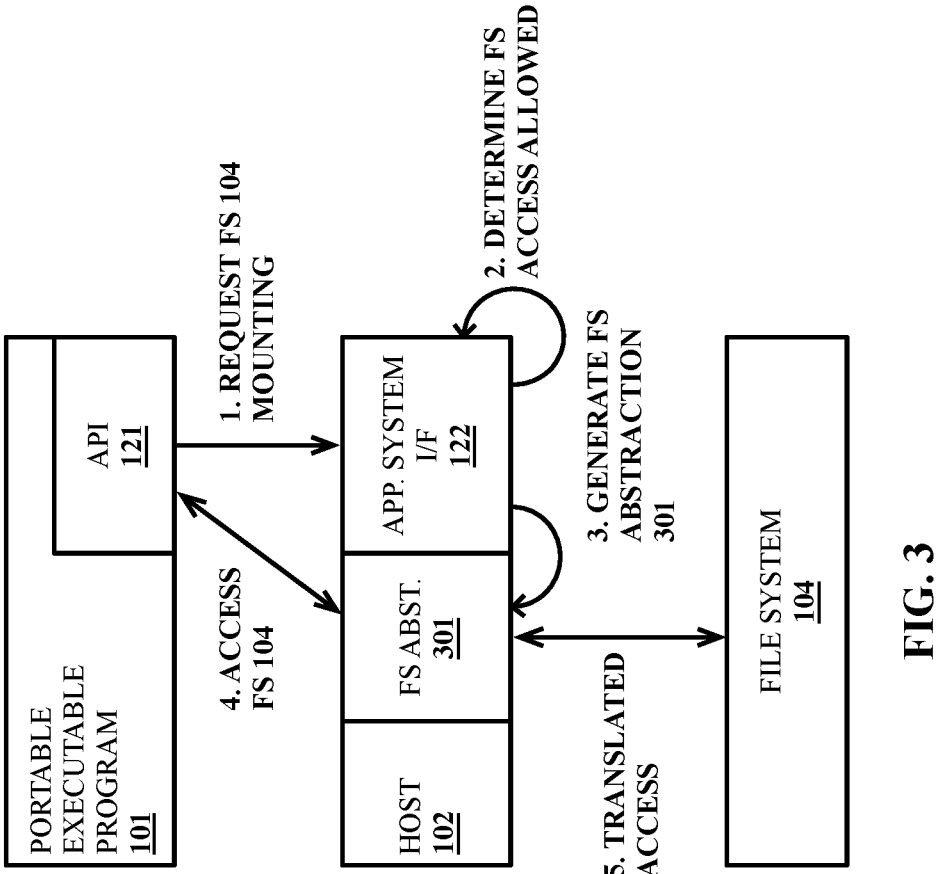
FIG. 3 illustrates an operational scenario for accessing a file system from a portable executable program during runtime.

FIG. 3 illustrates operational scenario 300 for accessing a file system from a portable executable program during runtime. Operational scenario 300 is more specific example for how file system 104 may be mounted to and access by portable executable program 101. In operational scenario 300, application system interface 122 determines that portable executable program 101 is configured to access file system 104 by receiving a message at step 1 from API 121 requesting that file system 104 be mounted to portable executable program 101. Portable executable program 101 may be coded with instructions to request mounting of file system 104 upon initialization or at some other point during runtime (e.g., may request mounting only when portable executable program 101 determines file system 104 is needed).

In this example, application system interface 122 determines that portable executable program 101 is allowed to access file system 104 at step 2. This determination may be beneficial if there is a chance portable executable program 101 could be a malicious program or a program that otherwise could adversely impact information stored in file system 104. Host 102 may maintain a list of one or more programs that are allowed to access file system 104 and, in this example, portable executable program 101 would be on that list.

After confirming that portable executable program 101 is allowed to access file system 104, application system interface 122 generates file system abstraction layer 301 at step 3. File system abstraction layer 301 will represent file system 104 to API 121. File system abstraction layer 301 may be considered part of application system interface 122 or may be considered a separate component of host 102. Although not shown, when application system interface 122 creates file system abstraction layer 301 application system interface 122 may also notify API 121 about the existence of file system abstraction layer 301 and, if necessary, information necessary to interact with file system abstraction layer 301, such as an identifier for file system abstraction layer 301 to which API 121 should direct messages.

Once file system abstraction layer 301 is created, portable executable program 101 uses messages in API 121 at step 4 to interact with file system abstraction layer 301 for access to file system 104. In this example, the messages from API 121 are translated by file system abstraction layer 301 at step 5 into messages or instructions that conform to file system 104. For example, portable executable program 101 may use API 121 to generate a message for file system abstraction layer 301 that requests a directory from file system 104 so that portable executable program 101 can navigate to a file in the directory. File system abstraction layer 301 receives that message and requests the directory from file system 104 using a convention required by file system 104. When receiving the directory from file system 104, file system abstraction layer 301 may further translate the directory into a message that complies with API 121.

Figure 4:
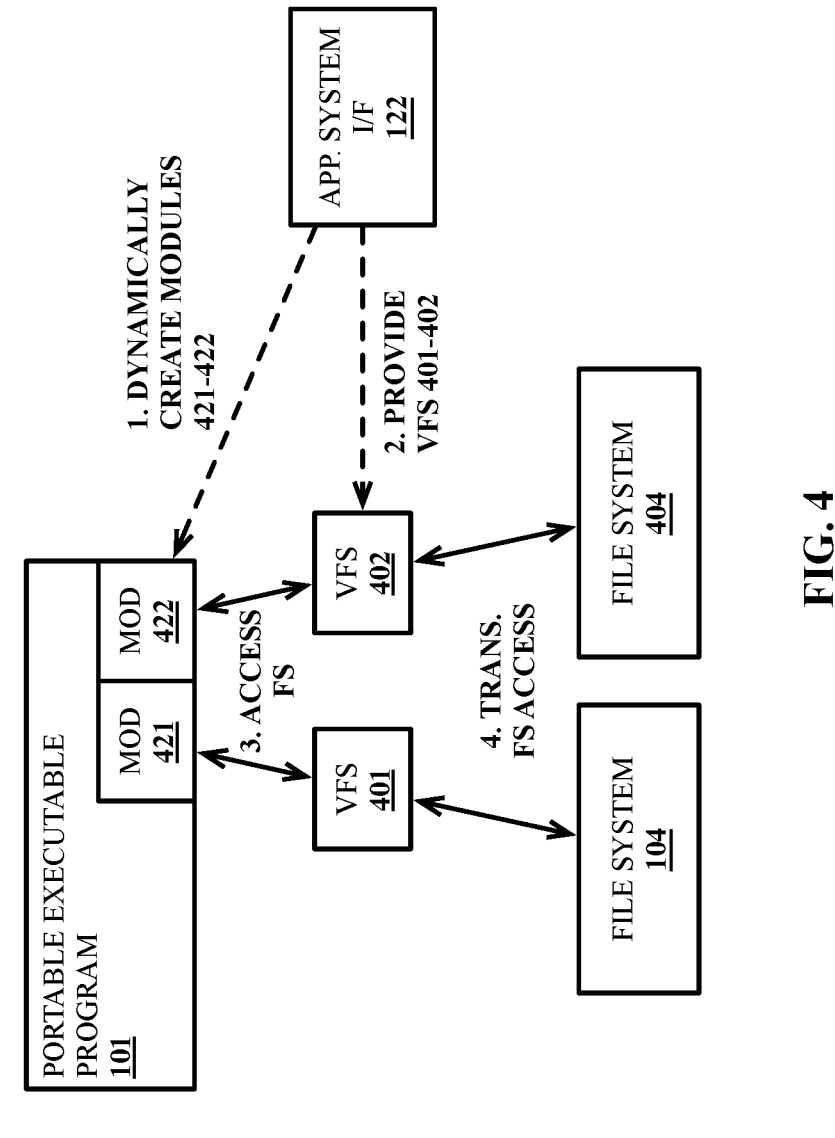
FIG. 4 illustrates an operational scenario for accessing file systems from a portable executable program during runtime.

FIG. 4 illustrates operational scenario 400 for accessing file systems from a portable executable program during runtime. Operational scenario 400 is another more specific example for how file system 104 may be mounted to and access by portable executable program 101. Operational scenario 400 is also an example of how multiple file systems can be mounted to portable executable program 101. File system 404 is a second file system in this example and may be a file system on one or more storage systems similar to storage system 105. More than two file systems may be available in other examples.

In this example, rather than portable executable program 101 requesting access to file system 104 and file system 404 via API 121, application system interface 122 recognizes that portable executable program 101 is executing and begins the process of mounting file system 104 and file system 404 to portable executable program 101. Application system interface 122 dynamically creates module 421 and module 422 in portable executable program 101 at step 1 using messages defined by API 121. Some formats for portable executable programs organize programs into modules rather that treating the portable executable program as one unsegmented whole. WebAssembly 2.0 is an example format that uses modules. In this example, module 421 and module 422 do not exist in portable executable program 101 until application system interface 122 uses API 121 to create module 421 and module 422 (e.g., generates a message indicating that portable executable program 101 should create module 421 and module 422). Module 421 is configured for accessing file system 104 and module 422 is configured for accessing file system 404. In other examples, portable executable program 101 may be written with module 421 and module 422 in mind such that module 421 and module 422 are already executing in portable executable program 101.

Application system interface 122 also generates virtual file system 401 and virtual file system 402 at step 2, which may occur contemporaneously with step 1. Virtual file system 401 and virtual file system 402 are the respective abstraction layers for file system 104 and file system 404 in this example. Typically, a virtual file system is used to provide files to a portable executable program with a file system structure that is independent of a file system in which the files are actually located. In this example, however, application system interface 122 configures virtual file system 401 to represent file system 104 and virtual file system 402 to represent file system 404. Thus, accessing virtual file system 401 should be no different from accessing file system 104 directly from the perspective of portable executable program 101 (e.g., virtual file system 401 is presented to include the same directory structure and files in those directories as file system 104). Likewise, virtual file system 402 should be no different from accessing file system 404 directly. While portable executable program 101 accesses virtual file system 401 and virtual file system 402 via module 421 and module 422, other examples may use virtual file systems in a similar manner even though the portable executable program therein does not use modules.

Once module 421, module 422, virtual file system 401, and virtual file system 402 are generated, module 421 handles access to virtual file system 401 and module 422 handles access to virtual file system 402 at step 3. Since file system 104 and file system 404 may be different types of file systems, virtual file system 401 may translate instructions differently than virtual file system 402 at step 4. For instance, an instruction to open a directory in file system 104 may be different from an instruction to open a directory in file system 404. In one example, one of the file systems may be a network file system (NFS) and the virtual file system would translate an instruction from portable executable program 101 into a message that can be carried over the transmission control protocol (TCP). Regardless of the translations needing to be performed, portable executable program 101 is enabled to access file system 104 and file system 404 for data rather than relying on host 102 to retrieve data and provide the data in a different manner, such as virtual file system that is independent of the file system from which the data came.

Figure 5:
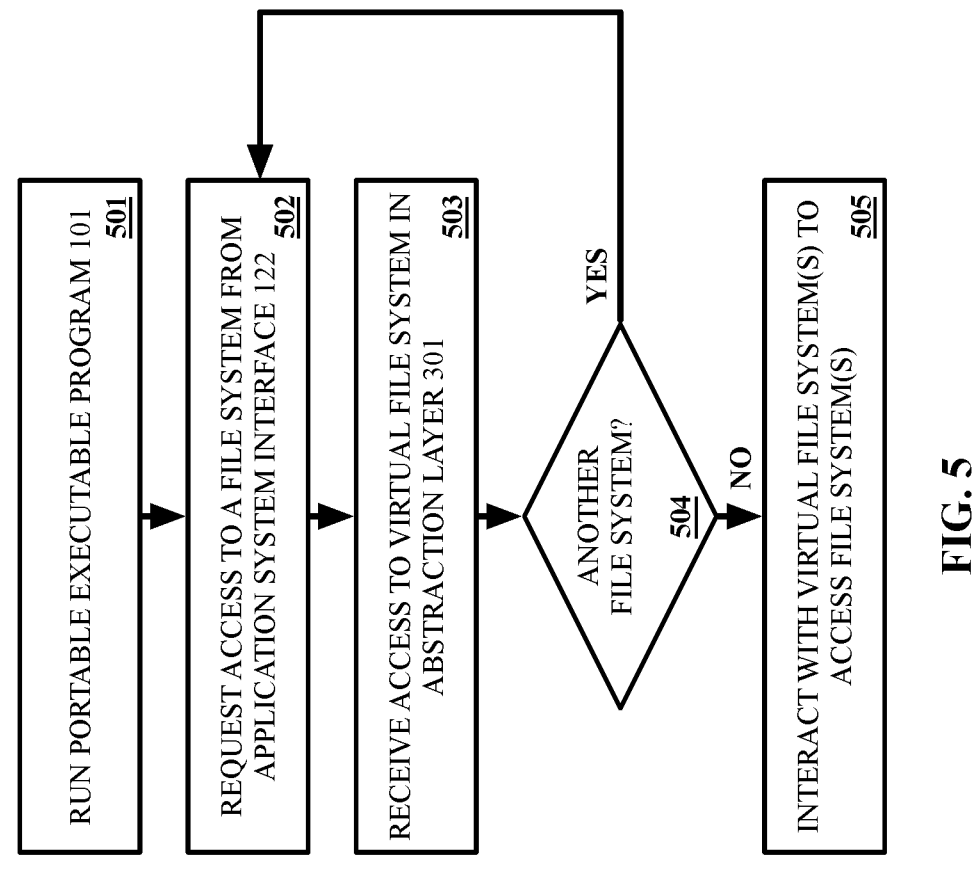
FIG. 5 illustrates an operation to access a file system from a portable executable program during runtime.

FIG. 5 illustrates operation 500 to access a file system from a portable executable program during runtime. Operation 500 is an example of steps that may be performed when access to multiple file systems is requested by portable executable program 101. In operation 500, host 102 runs portable executable program 101 (step 501). Portable executable program 101 uses API 121 to request that file system 104 be mounted for access (step 502). Portable executable program 101 may include information in the request that is necessary to identify file system 104 to application system interface 122. In examples like this one where multiple file systems may be accessible for mounting, portable executable program 101 can identify file system 104 as being the desired one of those file systems.

In response to the request, portable executable program 101 receives access to virtual file system 401 in file system abstraction layer 301 provided by application system interface 122 (step 503). Application system interface 122 may transfer a message via API 121 to portable executable program 101 indicating that the abstraction layer is ready for use. The message may include information for addressing file system access messages to the abstraction layer. In some examples, application system interface 122 may recognize messages meant for file system access and may automatically direct those messages to the abstraction layer.

Host 102 determines whether an additional file system should be mounted to portable executable program 101 and, if so, returns to step 502 (step 504). In this second iteration of step 502, portable executable program 101 requests access to file system 404. In some examples, the second iteration of steps 502 and 504 may occur in parallel with the first if portable executable program 101 requests access to both file systems at once. In response to the request for file system 404, portable executable program 101 receives access to virtual file system 402 in file system abstraction layer 301 during the second iteration of step 503. In this example, file systems 104 and 404 are the file systems requested by portable executable program 101 but, in other examples, further iterations may mount additional file systems to portable executable program 101.

Portable executable program 101 uses API 121 to interact with the abstraction layer to access file system 104 (step 505). As in the examples above, the messages from portable executable program 101 may be translated by virtual file systems 401 and 402 to access file systems 104 and 404. Likewise, information from file systems 104 and 404 may be translated for provision to portable executable program 101 via API 121 in a format understandable by API 121. Thus, portable executable program 101 is enabled to view file systems 104 and 404, read files from file systems 104 and 404, write files to file systems 104 and 404, and perform other file system actions as though portable executable program 101 was accessing file systems 104 and 404 directly.

Figure 6:
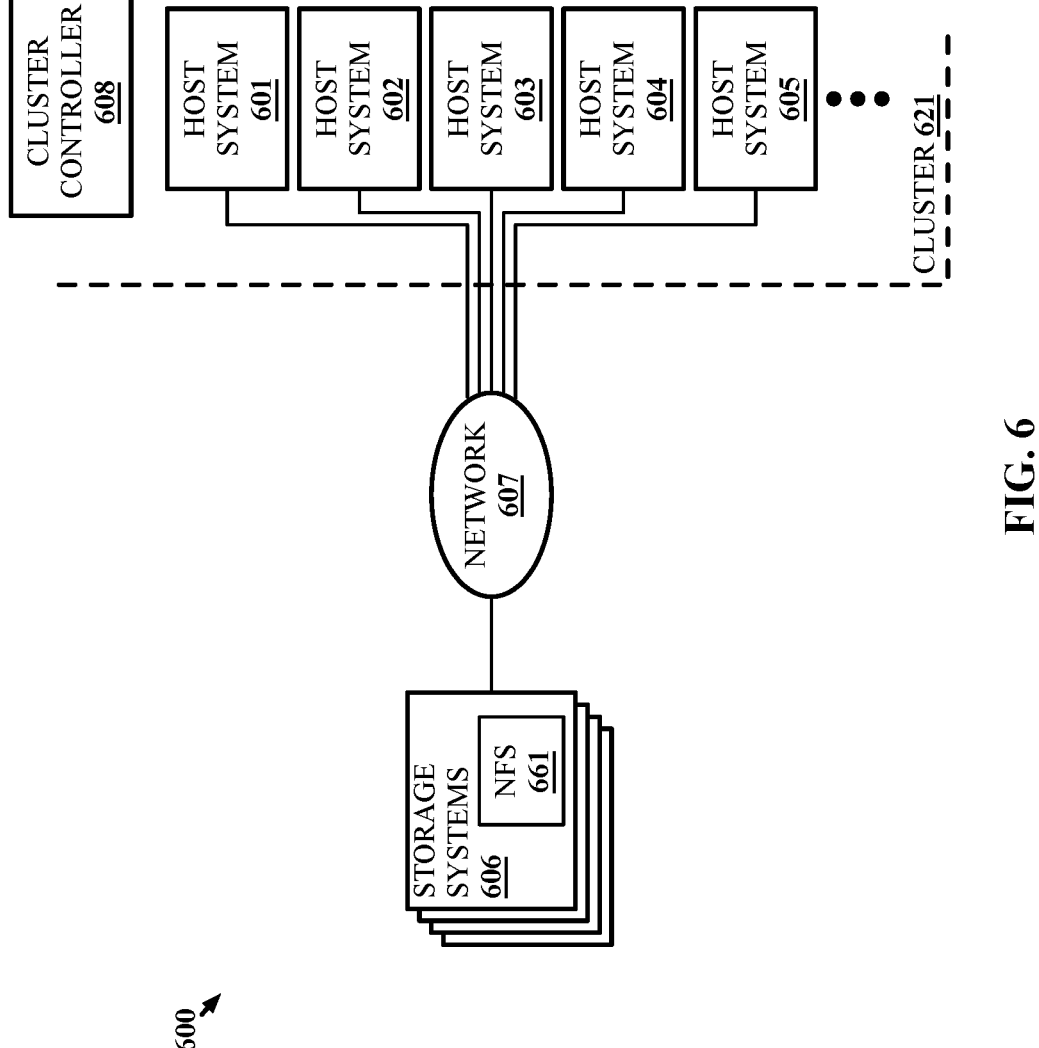
FIG. 6 illustrates an implementation for accessing a file system from a portable executable program during runtime.

FIG. 6 illustrates implementation 600 for accessing a file system from a portable executable program during runtime. Implementation 600 includes host systems 601-605, storage systems 606, network 607, and cluster controller 608. Host systems 601-605 are computing systems, such as servers, that are included in cluster 621. In some examples, cluster 621 may include more or fewer host systems. Host systems 601-605 communicate with each other and storage systems 606 over network 607. Network 607 includes systems, devices, and links to carry data communications. Network 607 may include one or more local or wide area networks, such as the Internet. Cluster controller 608 may also communicate over network 607. Although, in some examples, cluster controller 608 may be a software component executing on one or more of host systems 601-605 rather than a separate physical system. Storage systems 606 include one or more storage systems maintaining NFS 661. Each of storage systems 606 may include one or more hard disk drives, solid state drives, or some other form of computer readable media—including combinations thereof.

In operation, cluster controller 608 controls allocation of Wasm instances across host systems 601-605. For example, cluster controller 608 may be tasked with scaling Wasm instances configured to perform data processing on data stored in NFS 661. Scaling computing processes in a cluster has several benefits. Scaling allows for flexibility in handling fluctuating workloads and handle more concurrent requests or process more significant amounts of data. Resources can be quickly provisioned during peak times to ensure optimal performance and scaled down during slower periods to minimize costs. Scaling also enables businesses to optimize their computing resources and save money. Further, scaling provides fault tolerance by allowing the data processing to continue working even when an instance or host system fails.

Traditionally, virtualization mechanisms like virtual machines and containers may be used to scale processes within a cluster. Wasm applications typically use fewer resources than virtual machines and containers. Using instances of a Wasm application to perform data processing should free up resources for other purposes or save a customer on costs of performing a processing job. Unlike virtual machines and containers, the nature of Wasm applications prevents them from accessing file systems accessible via their hosts. The application system interfaces described herein, when executed on host systems 601-605, enable Wasm applications to access NFS 661 to process data stored thereon. Thus, instances of a Wasm application can be used to process data on NFS 661 in place of instances of a virtual machine or container.

Figure 7:
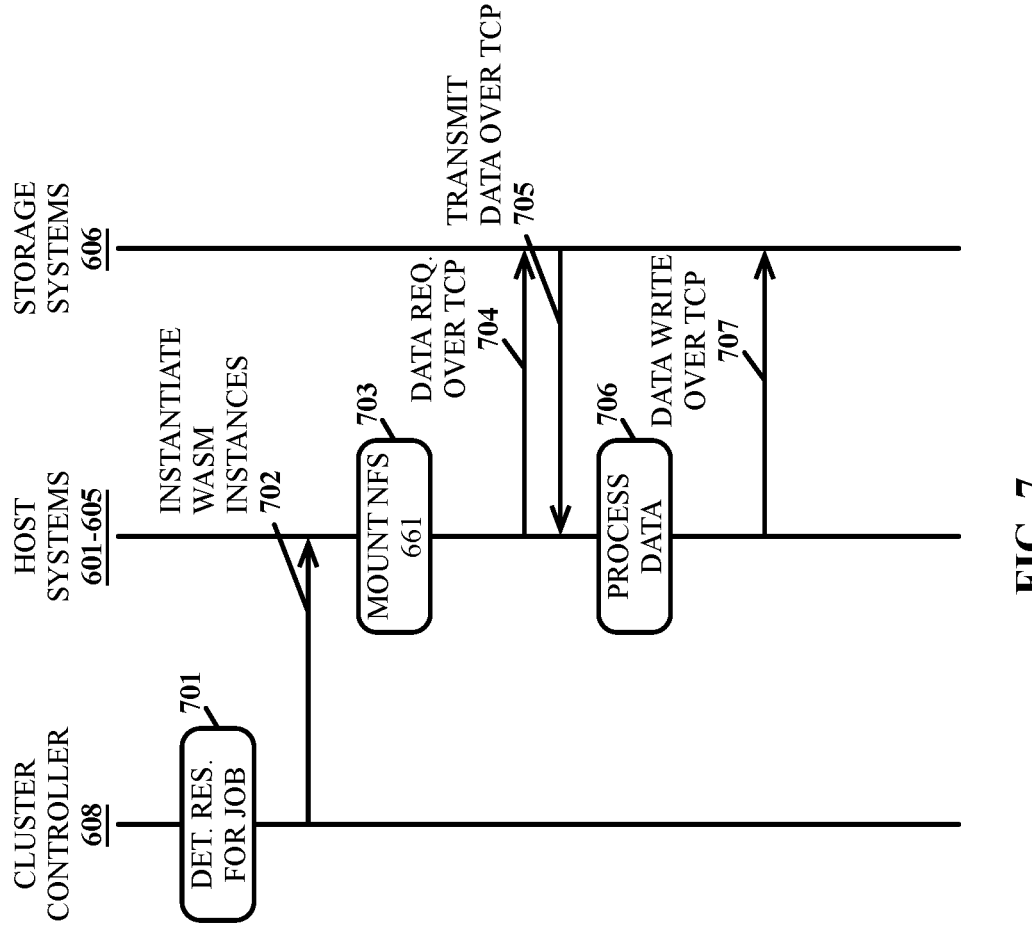
FIG. 7 illustrates an operational scenario for accessing a file system from a portable executable program during runtime.
Figure 7:

FIG. 7 illustrates operational scenario 700 for accessing a file system from a portable executable program during runtime. Operational scenario 700 is an example of cluster controller 608 scaling a data processing job across host systems 601-605. Cluster controller 608 determines resources for a data processing job (step 701). The data processing job may be a new job for performance in cluster 621 or may be an already ongoing job. For example, a client system connected to cluster controller 608 may provide for the data processing job parameters (e.g., what processing should be performed, where the data to be processed is located, where processed data should be stored, etc.) and direct cluster controller 608 to initiate the processing. In another example, the processing may be in progress and cluster controller 608 may monitor characteristics (e.g., resources available, amount of data to be processed, number of possible parallel processing threads, monetary costs of resources, completion time requirements, etc.) of the processing to determine whether different resources should be used. For instance, the data processing may use fewer host systems in cluster 621 during peak times when resources are more expensive then, during off-peak times when resources are cheaper, cluster controller 608 may determine that more resources can be used. In this example, cluster controller 608 determines that more resources should be used than are currently being used and, therefore, determines that the number of Wasm application instances performing the data processing should be increased.

Cluster controller 608 directs one or more of host systems 601-605 to instantiate the desired one or more new Wasm application instances (step 702). The direction may include identifying which data in NFS 661 each respective instance will be processing or the data may be identified to each instance from another source (e.g., a controller instance of the Wasm application). Each of host systems 601-605 executing a new Wasm application instance mounts NFS 661 via an application system interface provided by the host system using one of the mechanisms described above. NFS is a distributed file system protocol that enables file access over distributed storage platform 307 much like local storage is accessed. NFS is an open-source protocol that uses standard TCP/IP (Transmission Control Protocol/Internet Protocol) for communication. NFSv4 requires TCP, as is used in this example, but NFSv3 can use both TCP and UDP (User Datagram Protocol) on the same port. The Remote Procedure Call (RPC) system is used for remote procedure calls between storage systems 606 and host systems 601-605. The RPC system is part of the NFS protocol and was developed to allow remote procedure calls between different systems on a network. The RPC system uses TCP as the transport protocol by default, but it can also use UDP. The use of TCP ensures reliable data transfer and error detection.

When the Wasm instances request data for processing from NFS 661, the respective host systems 601-605 executing those instances generate a TCP message and transmits the message over network 607 to storage systems 606 (step 704). Host systems 601-605 may translate requests generated by the Wasm instances into the message in a format understood by NFS 661. The message may include an RPC requesting the data. The Wasm instance may be unaware that the requested data is in NFS 661 as opposed to some other type of file system. Upon receiving the TCP message, storage systems 606 respond by transmitting the requested data from NFS 661 to the respective requesting host systems 601-605 over network 607 (step 705). The data is retrieved from NFS 661 in storage systems 606 in the same manner it would in any other NFS data read scenario. NFS 661 does not need to be aware that a Wasm application is actually requesting the data.

Upon receiving the requested data, the respective host systems 601-605 pass the received data to the Wasm instances that requested the data and the Wasm instances process the received data (step 706). In this example, the processing may modify the received data, create new data, or otherwise generate data for storage in NFS 661. In other examples, the processing may not result in data for storage. For instance, Wasm instances may be searching the data for a condition to be met therein and may trigger an alert being sent to a user when the condition is met. In this example, the respective Wasm instances request the generated data be stored to NFS 661. Host systems 601-605 translate the write requests into TCP messages transmitted over network 607 to storage systems 606 (step 707). The TCP message may include an RPC for writing the data. The processed data may overwrite the requested data or may be stored elsewhere in NFS 661. Host systems 601-605 are, therefore, able to provide the Wasm application instances executing thereon with the ability to read data from and write data to NFS 661 despite the sandboxed nature of Wasm applications.

Figure 8:
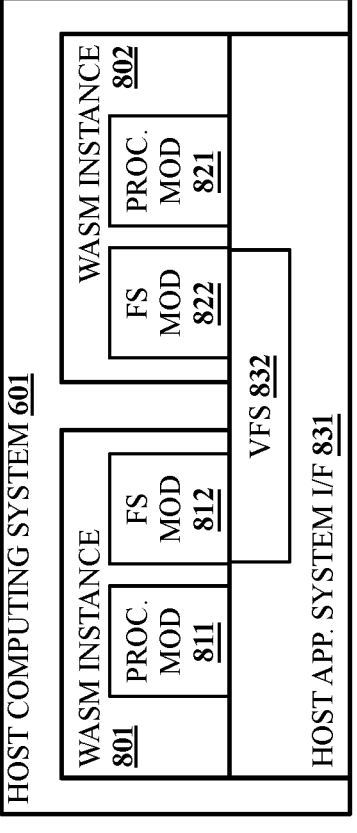
FIG. 8 illustrates an implementation for accessing a file system from a portable executable program during runtime.

FIG. 8 illustrates implementation 800 for accessing a file system from a portable executable program during runtime. Implementation 800 is an example of host system 601. Others of host systems 601-605 may be similarly configured. Host system 601 includes host application system interface 831 which hosts Wasm applications and enables Wasm applications to access hardware features of host system 601. In this example, host application system interface 831 is a WASI interface hosting two of the Wasm application instances discussed above in operational scenario 700, Wasm instance 801 and Wasm instance 802. Host system 601 may host multiple instances for the same job if host system 601 has processing capacity to handle the parallel processing enabled by hosting multiple instances. In other examples, host system 601 may host Wasm instances from different processing jobs. Wasm instance 801 and Wasm instance 802 may be instantiated at the same time or at different times (e.g., Wasm instance 801 may already be running when cluster controller 608 determined that Wasm instance 802 should be brought up as well).

Upon Wasm instance 801 and Wasm instance 802 being instantiated on host system 601, host application system interface 831 recognized that Wasm instance 801 and Wasm instance 802 will require access to NFS 661. In one example, parameters of Wasm instance 801 and Wasm instance 802 passed to host application system interface 831 when beginning their execution may indicate to host application system interface 831 that an interface to NFS 661 should be created. Other mechanisms for informing host application system interface 831 about Wasm application requirements may also be used. In response to determining that Wasm instance 801 and Wasm instance 802 require access to NFS 661, host application system interface 831 provides virtual file system 832 as an abstraction layer for NFS 661. Host application system interface 831 also directs Wasm instance 801 to create file system module 812 to interact with virtual file system 832 and directs Wasm instance 802 to create file system module 822 to interact with virtual file system 832. The direction from host application system interface 831 may include instructions for how file system module 812 and file system module 822 should interact with virtual file system 832 (e.g., a list of commands for interacting with virtual file system 832, a format of directories in virtual file system 832, etc.). Wasm instance 801 and Wasm instance 802 already include processing module 811 and file system module 812 for processing data retrieved via virtual file system 832. Unlike file system module 812 and file system module 822, processing module 811 and file system module 812 were present in Wasm instance 801 and Wasm instance 802 from the beginning. In other examples, Wasm instance 801 and Wasm instance 802 may be broken up into further modules (e.g., a first module may process data in one way while another module further processes the data in another way).

Figure 9:
FIG. 9 illustrates an operational scenario for accessing a file system from a portable executable program during runtime.

FIG. 9 illustrates operational scenario 900 for accessing a file system from a portable executable program during runtime. Operational scenario 900 is an example of how the modules of host system 601 interact with virtual file system 832 to access data from NFS 661. Specifically, operational scenario 900 focuses on processing module 811 and file system module 812 of Wasm instance 801 but processing module 821 and file system module 822 of Wasm instance 802 in a similar manner. Processing module 811 determines which data (e.g., files from NFS 661) it will next process and requests the data from file system module 812 (step 901). Processing module 811 may be preconfigured with information identifying the data processing module 811 should request from NFS 661 (e.g., identifying a file in NFS 661) or processing module 811 may receive the information during execution (e.g., from an instance of the Wasm application that is controlling the processing job).

In this example, virtual file system 832 mirrors NFS 661 to file system module 812. Thus, when processing module 811 identifies a file in NFS 661 to file system module 812 at step 901, file system module 812 sends a read instruction to virtual file system 832 to read the file from its location in NFS 661, which is mirrored in virtual file system 832 (step 902). The instruction does not need to be in a format understood by NFS 661 or any file system standard. The instruction need only be in a format understood by file system module 812 and virtual file system 832. Virtual file system 832 then handles the translation of the instruction into an instruction formatted for transmission to NFS 661 using TCP (step 903). After translation, the read instruction is in a standard NFS format that can be understood by any NFS file system rather than the read instruction understandable by file system module 812 and virtual file system 832. Virtual file system 832 transmits the TCP message to NFS 661 (step 904). NFS 661 responds to the TCP message like any other message by transmitting the requested data over TCP to virtual file system 832 (step 905). Depending on the format of the transmitted data, virtual file system 832 may translate the TCP-based data received from NFS 661 into a format understandable by file system module 812 (step 906). For example, if the data includes a list of directories in NFS 661, the data may reformat the list into a format of virtual file system 832 readable by file system module 812. In this case, since the data is going to be processed by processing module 811 (e.g., may be the contents of a file stored in NFS 661), the data itself may not need reformatting. Virtual file system 832 passes the data to file system module 812 in response to file system module 812's request (step 907). The data may be passed in a file system format understandable by file system module 812 and virtual file system 832 like the request from file system module 812. File system module 812 then passes the data to processing module 811 for processing (step 908).

Upon receiving the data, processing module 811 processes the data and generates processed data for storage in NFS 661 (step 909). Processing module 811 requests that file system module 812 write the processed data to NFS 661 (step 910). In response to the request, file system module 812 generates a data write instruction for virtual file system 832 to write the processed data (step 911). Again, the data write instruction may be a file system instruction in a format understandable by file system module 812 and virtual file system 832. Processing module 811 may indicate a location in NFS 661 (e.g., a directory or file) the processed data should be stored and, since virtual file system 832 mirrors NFS 661, file system module 812 can indicate the same location to virtual file system 832. Like in step 903, virtual file system 832 translates the write instruction to an NFS instruction over TCP (step 912). Virtual file system 832 transmits the NFS write instruction with the processed data over TCP to NFS 661 (step 913). In response to receiving the message, NFS 661 stores the data to the location indicated in the write instruction (step 914).

Advantageously, Wasm instance 801 can retrieve data from NFS 661, process the data, and store processed data in NFS 661. Wasm instances can, therefore, be used for data processing jobs that would otherwise be reserved for other types of process virtualization (e.g., virtual machines and containers).

Figure 10:
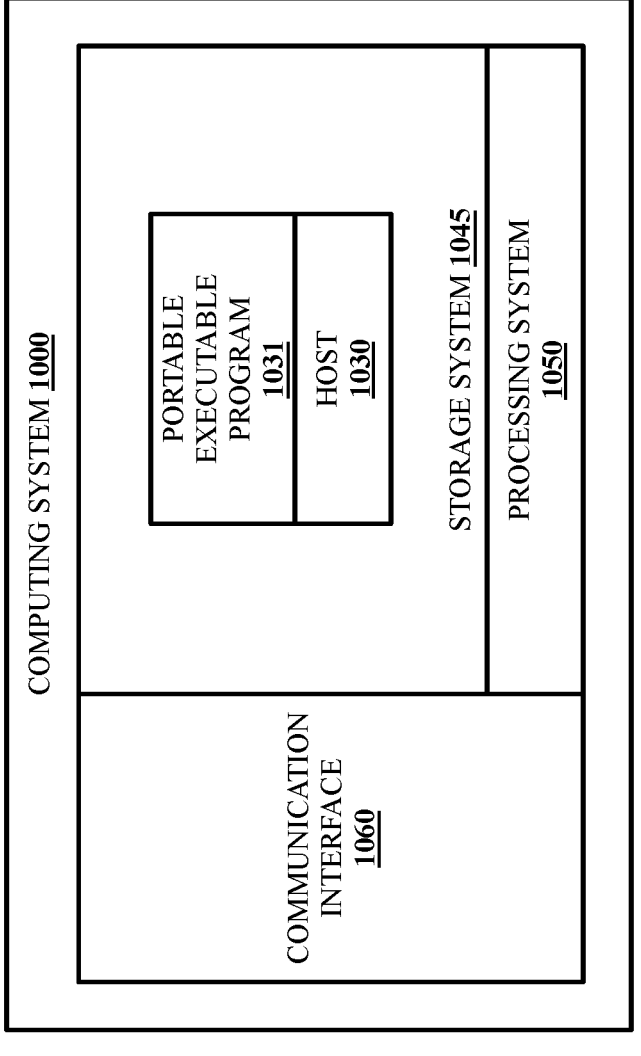
FIG. 10 illustrates a computing system for accessing a file system from a portable executable program during runtime.

FIG. 10 illustrates a computing system 1000 for accessing a file system from a portable executable program during runtime. Computing system 1000 is representative of any computing system or systems with which the various operational architectures, processes, scenarios, and sequences disclosed herein can be implemented. Computing system 1000 is an example architecture for portable executable program 101, host 102, and computing hardware 103, although other examples may exist. Computing system 1000 includes storage system 1045, processing system 1050, and communication interface 1060. Processing system 1050 is operatively linked to communication interface 1060 and storage system 1045. Communication interface 1060 may be communicatively linked to storage system 1045 in some implementations. Computing system 1000 may further include other components such as a battery and enclosure that are not shown for clarity.

Communication interface 1060 comprises components that communicate over communication links, such as network cards, ports, radio frequency (RF), processing circuitry and software, or some other communication devices. Communication interface 1060 may be configured to communicate over metallic, wireless, or optical links. Communication interface 1060 may be configured to use Time Division Multiplex (TDM), Internet Protocol (IP), Ethernet, optical networking, wireless protocols, communication signaling, or some other communication format—including combinations thereof. Communication interface 1060 may be configured to communicate with one or more web servers and other computing systems via one or more networks. Communication interface 1060 may be configured to communicate with a storage system, such as storage system 105.

Processing system 1050 comprises microprocessor and other circuitry that retrieves and executes operating software from storage system 1045. Storage system 1045 may include volatile and nonvolatile, removable, and non-removable media implemented in any method or technology for storage of information, such as computer readable instructions, data structures, program modules, or other data. Storage system 1045 may be implemented as a single storage device but may also be implemented across multiple storage devices or sub-systems. Storage system 1045 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no examples would storage media of storage system 1045, or any other computer-readable storage medium herein, be considered a transitory form of signal transmission (often referred to as "signals per se"), such as a propagating electrical or electromagnetic signal or carrier wave.

Processing system 1050 is typically mounted on a circuit board that may also hold the storage system. The operating software of storage system 1045 comprises computer programs, firmware, or some other form of machine-readable program instructions. The operating software of storage system 1045 comprises host 1030 and portable executable program 1031, which are respective examples of host 102 and portable executable program 101. The operating software on storage system 1045 may further include an operating system, utilities, drivers, network interfaces, applications, or some other type of software. When read and executed by processing system 1050 the operating software on storage system 1045 directs computing system 1000 to network routing advertisements as described herein. Host 1030 may execute natively on processing system 1050 or the operating software may include virtualization software, such as a hypervisor, to virtualize computing hardware on which host 1030 executes.

In at least one example, host 1030 executes on processing system 1050 and portable executable program 1031 executes on host 1030. Host 1030 directs processing system 1050 to providing an application system interface to portable executable program 1031. The application system interface interacts with an application programming interface (API) included in portable executable program 1031. The application system interface determines that the portable executable program is configured to access the file system and mounts the file system for portable executable program 1031.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A system for a portable executable program to access a file system, the system comprising:
   one or more computer readable storage media;
   one or more processing systems operatively coupled with the one or more computer readable storage media; and
   program instructions stored on the one or more computer readable storage media that, when read and executed by the processing system, direct the system to:
      recognize the portable executable program is executing on the one or more processing systems;

determine the portable executable program is configured to access the file system;
direct the portable executable program to create a module therein for file system access;
create an abstraction layer including a virtual file system with which the module exchanges file system commands, wherein the virtual file system mirrors directories of the file system to the portable executable program;
in the abstraction layer, translate the file system commands to translated commands for the file system; and
exchanging the translated commands between the abstraction layer and the file system.

2. The system of claim 1, wherein the program instructions direct the processing system to:
   direct a second portable executable program to create a second module therein for file system access; and
   enable the second portable executable program to access the abstraction layer to exchange the file system commands.

3. A method for a WebAssembly (Wasm) application to access a file system, the method comprising:
   in a host executing the Wasm application:
      creating a WebAssembly System Interface (WASI) to the Wasm application enabling the Wasm application to access features of the host, wherein the WASI interacts with an application programming interface (API) included in the Wasm application;
      in the WASI, determining that the Wasm application is configured to access the file system via the WASI;
      in the WASI, mounting the file system for the Wasm application; and
      passing file system instructions from the Wasm application to the file system through the WASI.

4. The method of claim 3, wherein mounting the file system comprises:
   creating an abstraction layer in the application system interface to interface between the Wasm application and the file system.

5. The method of claim 4, wherein the abstraction layer translates instructions between the Wasm application and the file system.

6. The method of claim 4, wherein the file system is a network file system (NFS), and the abstraction layer translates instructions from the Wasm application into a protocol used by the NFS.

7. The method of claim 3, wherein mounting the file system comprises:
   creating a module in the Wasm application at the direction of the WASI, wherein, upon creation, the module is a component of the Wasm application-that handles interactions with the file system.

8. The method of claim 3, comprising:
   in the WASI, determining that the Wasm application is configured to access a second file system via the WASI;
   in the WASI, mounting the second file system for the Wasm application; and
   passing file-system instructions from the Wasm application to the file system through the WASI.

9. The method of claim 8, wherein mounting the file system and mounting the second file system comprises:
   creating a first module and a second module in the Wasm application at the direction of the WASI, wherein, upon creation, the first module is a component of the Wasm application that handles interactions with the files system and the second module is a component of the Wasm application that handles interactions with the second file system.

10. The method of claim 3, comprising:

in the Wasm application:

generating a read instruction to access data from a file in the file system, wherein the read instruction is included in the file system instructions passed to the file system;

processing the data to generate processed data; and generating a write instruction to store the processed data to the file system, wherein the write instruction is included in the file system instructions passed to the file system.

11. A method for a portable executable program to access a network file system (NFS), the method comprising:

in a cluster of computing nodes configured to execute multiple instances of the portable executable program:

determining one or more instances of the portable executable program should be used to perform a processing task on data stored in the NFS;

instantiate the instances in the cluster;

enabling the instances to communicate with the NFS via an application system interface included in the computing nodes; and exchanging access instructions between the instances and the NFS to process the data including:

in one of the instances, requesting at least a portion of the data in a file system instruction; and in the application system interface, packaging the instruction in a message for transmission over a network using transmission control protocol (TCP).

12. The method of claim 11, wherein enabling the instances to communicate with the NFS comprises:

presenting a virtual file system to the instances, wherein the instances interact with the virtual file system and wherein directories of the virtual file system correspond to directories of the NFS.

13. The method of claim 12, wherein exchanging the access instructions comprises:

translating interactions with the virtual file system into interactions with the NFS.

14. The method of claim 11, wherein exchanging the access instructions comprises:

in one of the instances:

navigating to a directory of the NFS; and retrieving a file from the directory.

15. The method of claim 11, wherein the computing nodes use one of two or more different underlying computing architectures.

16. One or more computer readable storage media having program instructions stored thereon for a portable executable program to access a file system, the program instructions, when read and executed by a processing system, direct the processing system to:

in the portable executable program including an application programming interface (API) for mounting the file system:

request that a host mount the file system;

receive an instruction from the host to create a file system module to handle interactions with the file system;

in the file system module, access an abstraction layer for the file system provided by the host;

in a data processing module of the portable executable program, direct the file system module to request data from a directory of the file system; and in the file system module, find the data in the file system;

pass an API call to the host requesting the data; and receive an API message from the host including the data.

17. The one or more computer readable storage media of claim 16, wherein the instruction comprises an API call provided by the API.

18. A system for a portable executable program to access a file system, the system comprising:

one or more computer readable storage media;

one or more processing systems operatively coupled with the one or more computer readable storage media; and program instructions stored on the one or more computer readable storage media that, when read and executed by the processing system, direct the system to:

recognize the portable executable program is executing on the one or more processing systems;

determine the portable executable program is configured to access the file system;

direct the portable executable program to create a first module therein for file system access;

direct a second portable executable program to create a second module therein for file system access;

create an abstraction layer enabling the first module and the second module to exchange file system commands;

in the abstraction layer, translate the file system commands to translated commands for the file system; and exchanging the translated commands between the abstraction layer and the file system.

19. A method for a portable executable program to access a network file system (NFS), the method comprising:

in a host executing the portable executable program:

creating an application system interface to the portable executable program enabling the portable executable program to access features of the host, wherein the application system interface interacts with an application programming interface (API) included in the portable executable program;

in the application system interface, determining that the portable executable program is configured to access the NFS via the application system interface;

in the application system interface, mounting the NFS for the portable executable program;

creating an abstraction layer in the application system interface, wherein the abstraction layer interfaces between the portable executable program and the NFS; and in the abstraction layer, translating file system instructions from the portable executable program into a protocol used by the NFS and passing the file system instructions from the portable executable program to the NFS.

20. A method for a portable executable program to access file systems, the method comprising:

in a host executing the portable executable program:

creating an application system interface to the portable executable program enabling the portable executable program to access features of the host, wherein the application system interface interacts with an application programming interface (API) included in the portable executable program;

in the application system interface, determining that the portable executable program is configured to access a first file system and a second file system via the application system interface;

in the application system interface, mounting the first file system and the second file system for the portable executable program;

passing first file system instructions from the portable executable program to the first file system through the application system interface; and passing second file system instructions from the portable executable program to the second file system through the application system interface.

21. A method for a portable executable program to access a file system, the method comprising:

in a host executing the portable executable program:

creating an application system interface to the portable executable program enabling the portable executable program to access features of the host, wherein the application system interface interacts with an application programming interface (API) included in the portable executable program;

in the application system interface, determining that the portable executable program is configured to access the file system via the application system interface; and in the application system interface, mounting the file system for the portable executable program; and in the portable executable program:

generating a read instruction to access data from a file in the file system;

passing the read instruction to the application system interface, wherein the application system interface passes the read instruction to the file system;

processing the data to generate processed data;

generating a write instruction to store the processed data to the file system; and passing the write instruction to the application system interface, wherein the application system interface passes the write instruction to the file system.

* * * * *